United States Patent

Stingelin

[11] Patent Number: 5,241,054
[45] Date of Patent: Aug. 31, 1993

[54] CATIONIC AZO DYES

[75] Inventor: Willy Stingelin, Reinach, Switzerland

[73] Assignee: Ciba-Geigy Corporation, Ardsley, N.Y.

[21] Appl. No.: 628,767

[22] Filed: Dec. 17, 1990

[30] Foreign Application Priority Data

Dec. 22, 1989 [CH] Switzerland .......................... 4642/89

[51] Int. Cl.$^5$ ...................... C09B 44/08; C09B 44/10
[52] U.S. Cl. .................... 534/604; 534/605; 534/606; 534/588
[58] Field of Search ...................... 534/604, 605, 606

[56] References Cited

U.S. PATENT DOCUMENTS

| | | | |
|---|---|---|---|
| 4,168,264 | 9/1979 | Koller et al. | 260/165 |
| 4,248,775 | 2/1981 | Raue | 260/154 |
| 4,873,319 | 10/1989 | Stingelin | 534/604 |

FOREIGN PATENT DOCUMENTS

0263073 4/1988 European Pat. Off. .

*Primary Examiner*—José G. Dees
*Assistant Examiner*—Keith MacMillan
*Attorney, Agent, or Firm*—Kevin T. Mansfield; Edward McC. Roberts

[57] ABSTRACT

The novel azo dyes of formula I as indicated in claim 1 are suitable for dyeing and printing, especially paper of all kinds.

18 Claims, No Drawings

CATIONIC AZO DYES

The present invention relates to novel unsulfonated cationic azo dyes, to their preparation, and to the use thereof for dyeing textile materials and, in particular, paper.

The novel azo dyes have the formula

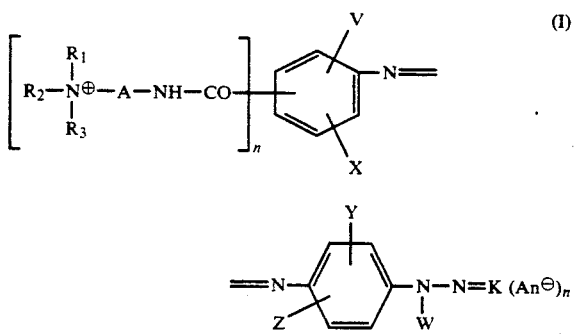

wherein
$R_1$, $R_2$ and $R_3$ are each independently of one another an unsubstituted or substituted alkyl radical or $R_1$ and $R_2$, together with the linking nitrogen atom, or $R_1$, $R_2$ and $R_3$, together with the linking nitrogen atom, are a heterocyclic radical, A is an alkylene radical of 2 to 6 carbon atoms, V and X are each independently of the other hydrogen, $C_1$-$C_4$alkyl or $C_1$-$C_4$alkoxy, each unsubstituted or substituted by hydroxy, halogen, cyano or $C_1$-$C_4$alkoxy, Y is hydrogen, $C_1$-$C_4$alkyl or $C_1$-$C_4$alkoxy, halogen or cyano, Z is hydrogen, $C_1$-$C_4$alkyl or $C_1$-$C_4$alkoxy, halogen, cyano, a group of formula

—NH—CHO.

—NH—CO—NH$_2$.

—NH—CO—NH—Q or

—NH—CO—(O)$_m$—Q, wherein m is 0 or 1 and Q is unsubstituted or substituted $C_1$-$C_4$alkyl or phenyl, W is an unsubstituted or substituted alkyl radical, K is a coupling component of formula

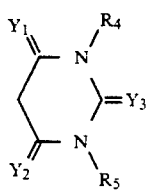 (II)

wherein
$Y_1$ and $Y_2$ are each independently of the other =O, =NH or =N—$C_1$-$C_4$alkyl, $Y_3$ is =O, =S, =NR or =N—CN, wherein R is hydrogen or $C_1$-$C_4$alkyl, $R_4$ and $R_5$ are each independently of the other hydrogen, unsubstituted or substituted alkyl or unsubstituted or substituted phenyl, n is 1 or 2, and An$^\ominus$ is an anion.

Although in formula II above only one tautomeric form of the coupling component is shown, this formula will also be understood as embracing the other tautomeric forms. Furthermore, formula I will be understood as also embracing those dyes in which the radical W is attached to an oxygen or nitrogen atom which, in the coupling component K, is in ortho-position to the azo bridge.

$R_1$, $R_2$, $R_3$ and W are each independently of one another an unsubstituted or substituted alkyl radical such as methyl, ethyl, n- or isopropyl, n-, sec- or tert-butyl, straight-chain or branched pentyl or hexyl, cyclopentyl or cyclohexyl, which radicals may be substituted, for example by hydroxy, alkoxy, cyano, carbamoyl or carbamoyl which is mono- or dialkylated at the N-atom, or phenyl which may be further substituted, for example by alkyl or alkoxy.

Exemplary of such substituted radicals are hydroxymethyl, hydroxyethyl, methoxyethyl, ethoxyethyl, propoxypropyl, benzyl, cyanoethyl or carbamoylethyl.

$R_1$ and $R_2$, together with the linking nitrogen atom, may also be a heterocyclic radical, for example a pyrrolidine, piperidine, morpholine or piperazine radical; or $R_1$, $R_2$ and $R_3$, together with the linking nitrogen atom, are a heterocyclic radical, e.g. a pyridinium or monoquaternised triethylenediamine radical. $C_1$-$C_3$alkyl and are preferably each methyl.

A as a $C_2$-$C_6$alkylene radical, is preferably an unbranched radical, such as ethylene, propylene, butylene, pentylene or hexylene. The preferred meaning of A is ethylene or butylene and, more particularly, propylene.

V and X are each independently of the other hydrogen, $C_1$-$C_4$alkyl or $C_1$-$C_4$alkoxy, each of which last-mentioned groups may be substituted by hydroxy, halogen such as bromo or, preferably, chloro, or by cyano or $C_1$-$C_4$alkoxy. Preferably V is hydrogen and X is hydrogen, methyl or methoxy.

Y is hydrogen, $C_1$-$C_4$alkyl or $C_1$-$C_4$alkoxy, halogen such as bromo or chloro, or is cyano. Preferably Y is hydrogen, methyl, methoxy or chloro.

Z is hydrogen, $C_1$-$C_4$alkyl or $C_1$-$C_4$alkoxy, halogen such as bromo or chloro, or is cyano or a group of formula —NH—CHO, —NH—CO—NH$_2$, —NH—CO—NHQ or —NH—CO—(O)$_{\overline{m}}$Q, wherein m is 0 or 1 and Q is unsubstituted or substituted $C_1$-$C_4$alkyl or phenyl. Suitable substituents of the alkyl groups Q are, typically, halogen such as chloro or bromo, or, preferably, groups of formulae

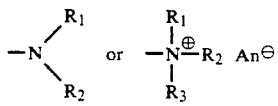

in which $R_1$, $R_2$ and $R_3$ are as defined above and An$^\ominus$ is an anion. Illustrative of suitable substituents of the phenyl group Q are: $C_1$-$C_4$alkyl, $C_1$-$C_4$alkoxy, halogen or nitro.

Preferably Z is methyl, ethyl, methoxy, ethoxy, acetylamino, propionylamino, methoxycarbonylamino, ethoxycarbonylamino or a group of formula

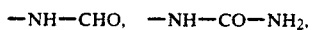

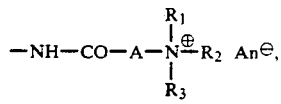

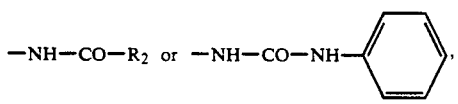

wherein A is methylene, ethylene, propylene or butylene, R₁ is methyl or hydroxyethyl, and R₂ and R₃ are each independently of the other C₁-C₃alkyl.

W is preferably C₁-C₄alkyl which may be substituted by hydroxy, cyano, alkoxy, phenyl or carbamoyl.

In the definition of the coupling component K of formula II above, R₄ and R₅ are each independently of the other hydrogen, unsubstituted or substituted alkyl or unsubstituted or substituted phenyl.

R₄ and R₅ as unsubstituted or substituted alkyl are typically a methyl, ethyl, n-propyl or isopropyl, n-butyl, sec-butyl or tert-butyl radical, or a straight chain or branched pentyl or hexyl radical or a cyclohexyl radical, which radicals may be substituted, for example by one or more members selected from the group consisting of —OH, C₁-C₄alkoxy and C₁-C₄hydroxyalkoxy.

Typical examples of suitable substituted alkyl radicals are: methoxymethyl, ethoxymethyl, ethoxyethyl, ethoxypropyl, n-propoxymethyl, isopropoxymethyl, butoxymethyl, butoxyethyl, butoxypropyl, ethoxypentyl, methoxybutyl, ethoxypentyl and 2-hydroxyethoxypentyl.

R₄ and R₅ as phenyl or substituted phenyl may be: unsubstituted phenyl or phenyl which is substituted by one or more identical or different radicals. Exemplary of such radicals are: C₁-C₄alkyl such as methyl, ethyl, n-propyl or isopropyl, or n-butyl, sec-butyl or tert-butyl; C₁-C₄alkoxy, which throughout this specification will generally be understood as comprising methoxy, ethoxy, n-propoxy or isopropoxy, or n-butoxy, sec-butoxy or tert-butoxy; and halogen such as fluoro, chloro or bromo; and nitro.

Preferably R₄ and R₅ as phenyl are phenyl which is substituted by 1 to 3 identical or different members of the group consisting of C₁-C₄alkoxy, chloro and methoxy; but the preferred meaning is unsubstituted phenyl.

R₄ and R₅ are preferably hydrogen or C₁-C₄alkyl, most preferably hydrogen or methyl.

Y₁ and Y₂ are preferably the functional group =O or =NH and it is also preferred that Y₁ and Y₂ are identical. Most preferably Y₁ and Y₂ are identical and are each =O. Y₃ is preferably the group =O, =S, =NH or =N-CN. Most preferably, Y₃ is the group =O.

In a particularly preferred embodiment of the azo dyes of this invention, Y₁, Y₂ and Y₃ are each =O.

Possible anions An⊖ are inorganic as well as organic anions. Illustrative examples are: a halide anion such as the chloride, bromide or iodide anion; the sulfate, methyl sulfate, boron tetrafluoride, aminosulfonate, perchlorate, carbonate, bicarbonate, phosphate, phosphoromolybdate, phosphorotungstate, phosphorotungstomolybdate, benzenesulfonate, naphthalenesulfonate, 4-chlorobenzenesulfonate, oxalate, maleate, acetate, propionate, lactate, succinate, chloroacetate, tartrate, methanesulfonate or benzoate ion; or a complex anion such as the anion of chlorozinc double salts.

The anion is normally governed by the preparatory process. Preferably the anion is present as chloride, hydrogen sulfate, sulfate, methosulfate, phosphate, formate, lactate or acetate. It can be exchanged in known manner for another anion.

A preferred embodiment of this invention relates to azo dyes of formula I, wherein R₁ is methyl or hydroxyethyl, R₂ and R₃ are each independently of the other C₁-C₃alkyl, A is ethylene, propylene or butylene, V is hydrogen, X is hydrogen, methyl or methoxy, Y is hydrogen, methyl, methoxy or chloro, Z is methyl, methoxy, ethyl, ethoxy, acetylamino, propionylamino, methoxycarbonylamino, ethoxycarbonylamino or a group of formula

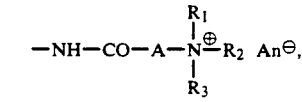

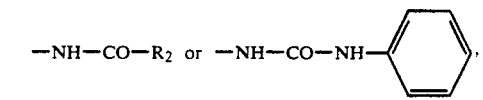

W is C₁-C₄alkyl or C₁-C₄alkyl which is substituted by hydroxy, cyano, C₁-C₄alkoxy, phenyl or carbamoyl, K is a coupling component of formula

wherein

Y₁ and Y₂ are each independently of the other =O or =NH,

Y₃ is =O, =S, =NH or =N-CN,

R₄ and R₅ are each independently of the other hydrogen or C₁-C₄alkyl, n is 1 or 2, and An⊖ is an anion.

Among these compounds, those azo dyes are preferred in which R₁, R₂ and R₃ are each methyl, A is propylene, V and X are each hydrogen, Y₃ is =O, R₄ and R₅ are each hydrogen or methyl, and the other symbols are as defined above.

The azo dyes of formula I are prepared in a manner which is known per se, for example by diazotising an amine of formula

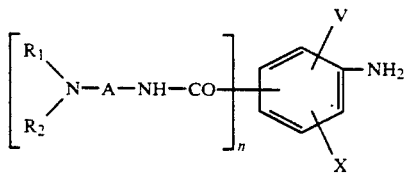

reacting the diazotised amine with a coupling component of formula

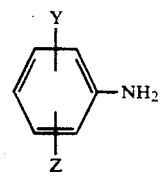

diazotising the aminoazo compound so obtained and coupling the diazotised aminoazo compound with a coupling component of formula

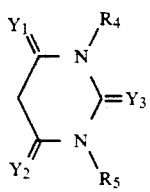

and subsequently reacting the coupling product with an alkylating agent which introduces the radicals $R_3$ and W, which radicals $R_3$ and W have the identical meaning. In formulae II, III and IV, $R_1$, $R_2$, $R_3$, A, V, X, Y, Z, $Y_1$, $Y_2$, $Y_3$, $R_4$, $R_5$, n, W and $An^\ominus$ have the meanings and preferences cited above.

The compounds of formulae II, III and IV are known or can be prepared in known manner.

A further method of preparing the azo dyes of this invention comprises reacting a dye of formula

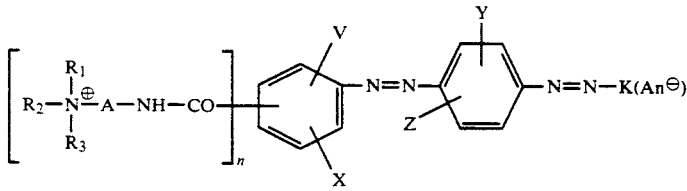

with an alkylating agent which introduces the group W. The symbols, $R_1$, $R_2$, $R_3$, A, n, V, X, Z, Y, K, $An^\ominus$ and W in formula V have the same meanings as for formula I.

Although in formula V above only one tautomeric form is shown for the bond of the azo group to the coupling component K, this formula will be understood as also embracing the hydrazo form of the dye.

The dyes of formula V are disclosed in EP-A-263 073. The reaction conditions for the alkylation of the dyes of formula V correspond to those customary for such reactions.

The azo compounds of formula I are used as powder or granular formulations as well as in the form of concentrated solutions. Powder formulations are standardised in conventional manner with extenders such as sodium sulfate, sodium phosphate, sodium chloride or sodium acetate, in the presence of dust inhibitors, or the azo compounds are marketed direct as spray dried formulations. Concentrated dye solutions may be of aqueous or aqueous-organic nature, in which case customary and preferably readily degradable auxiliaries are preferred, for example organic acids, preferably acetic acid, formic acid, lactic acid or citric acid, amides such as formamide or dimethyl formamide, urea, alcohols such as glycol, diglycol or polyglycols or diglycol ethers, preferably methyl or ethyl ethers.

The azo compounds of formula I are used in particular as dyes for dyeing and printing textile materials, paper, leather, and for preparing inks. Suitable textile materials are cationically dyeable natural and synthetic materials. The novel azo compounds are preferably used for dyeing and printing paper, semi-cardboards and cardboard in the pulp and on the surface, as well as for dyeing textile materials consisting preferably, for example, of homopolymers or copolymers of acrylonitrile or of synthetic polyamides or polyesters which are modified by acid groups. These textile materials are preferably dyed in aqueous, neutral or acid medium by the exhaust process, under normal or elevated pressure, or by the continuous dyeing process. The textile material can be in any form of presentation, for example fibres, filaments, woven and knitted fabrics, piece goods and finished goods, such as shirts or pullovers.

Level dyeings and prints which are distinguished by very good allround fastness properties, especially very good exhaust properties and good fastness to water, are obtained with the dyes of this invention. In particular, the dyes of this invention exhaust very well on to, and give dyeings of good lightfastness on, rapidly exhausting polyacrylonitrile material.

The novel azo compounds of formula I can also be used for dyeing and printing natural and regenerated cellulosic materials, especially cotton and viscose, on which dyeings of good tinctorial strength are likewise obtained.

The novel azo compounds of formula I have good affinity for these textile materials, a good degree of exhaustion, and the dyeings obtained have very good fastness properties, in particular good wetfastness properties.

A preferred utility of the novel azo compounds of formula I is that of dyeing paper of all kinds, especially bleached unsized or sized lignin-free paper, which comprises starting from bleached or unbleached pulp, using hardwood or softwood kraft pulp such as birchwood sulfite or kraft pulp or pine sulfite or kraft pulp. These compounds are most especially suitable for dyeing unsized paper (e.g. napkins, tablecloths, hygienic papers) on account of their very high affinity for this substrate.

The novel azo compounds of formula I exhaust very well on to these substrates, so that the wastewaters remain virtually colourless.

Dyeings in yellow, yellowish orange or red shades are obtained.

The resultant dyeings are distinguished by good all-round fastness properties such as good lightfastness with concomitant excellent clarity and tinctorial strength and wetfastness, i.e. they exhibit no tendency to bleed when dyed paper in the wet state is brought into contact with wet white paper. In addition they have good fastness to alum, acid and alkali. The wetfastness relates not only to water, but also to milk, fruit juice and sweetened mineral water. Owing to their good fastness to alcohol, the dyeings are also resistant to alcoholic beverages. This property is especially desirable e.g. for napkins and tablecloths of which it may be expected that the dyed paper in the wet state (e.g. impregnated with water, alcohol, surfactant solution and the like) will come into contact with other substrates such as textiles, paper and the like, which have to be protected against soiling.

The excellent affinity for paper and the high rate of exhaustion of the novel dyes is very advantageous for the continuous dyeing of paper.

The following Examples illustrate the invention, but imply no limitation to what is described therein. Unless otherwise indicated, parts are by weight.

The abbreviation RKN is a quality description and indicates the degree of purity of the cellulose; the abbreviation SR (Schopper-Riegler) indicates freeness.

B) 7.7 parts of the compound prepared according to A) are dissolved in 35 parts of water, then 30 parts of ice and 7 parts of 32% hydrochloric acid are added and diazotisation is effected at 0°-5° C. with 20.8 parts or 1N sodium nitrite solution. Then 2.4 parts of 2,5-dimethylaniline are dissolved in 42 parts of 3.5% hydrochloric acid and the solution is added dropwise to the diazo solution. The coupling mixture is adjusted to pH 3.5-4 by strewing in crystalline sodium acetate. As soon as no more diazo solution can be detected, the dye is salted out with sodium chloride. The precipitate is then isolated by filtration and washed with saline solution. The monoazo dye so obtained is suspended in 100 parts of water, then 7 parts of 32% hydrochlorid acid are added and diazotisation is effected at 0°-5° C. with 19.2 parts of 1N sodium nitrite solution. The diazo solution is added dropwise at 0°-10° C. to a solution of 2.4 parts of barbituric acid in 100 parts of water and 15 parts of 30% aqueous sodium hydroxide while keeping the pH at 6-7 by addition of aqueous sodium hydroxide.

The reaction mixture is stirred for 4 hours, the pH is raised to 9-10 with aqueous sodium hydroxide, and then 5.8 parts of dimethyl sulfate are added dropwise at 20°-25° C. over 30 minutes. After addition of 160 parts of ethanol, stirring is continued for a further 2 hours and the precipitated dye is filtered with suction, washed with ethanol and then with acetone, and dried under vacuum at 60° C. The dye of formula

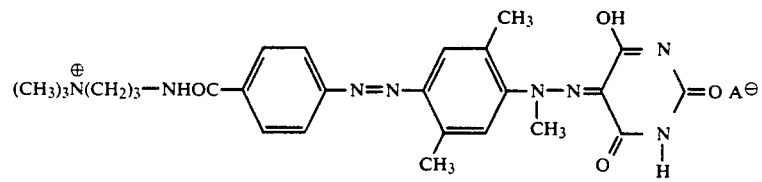

$A^\ominus$: mixture of $Cl^\ominus$ and $CH_3OSO_3^\ominus$

EXAMPLES 1

A) 95.1 parts of dimethylaminopropylamine are added dropwise over 15 minutes to a solution of 84 parts of p-nitrobenzoyl chloride in 260 parts of toluene. The ensuing reaction is exothermic and the temperature rises to 95° C. After the temperature has fallen to 30° C. 200 parts of water are added, the batch is cooled to 10° C. and the precipitated product is filtered with suction. The filter cake is washed with water until free of salt and dried at 60° C. under vacuum. For hydrogenation, the product is dissolved in 320 parts of methanol and 52 parts of 32% hydrochloric acid in the pressure of palladium on carbon and hydrogenated with hydrogen. Upon completion of the reduction, the catalyst is removed by suction filtration and the methanol is distilled off under vacuum. The residue has the formula

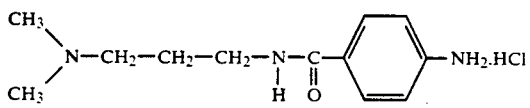

is obtained in the form of a powder which is soluble in dilute formic acid and dyes paper in a yellowish orange shade. The dyeings obtained on paper have good light- and wetfastness properties.

EXAMPLE 2

The procedure described in Example 1 A) is repeated, using in place of p-nitrobenzoylchloride the same amount of m-nitrobenzoylchloride, to give the compound of formula

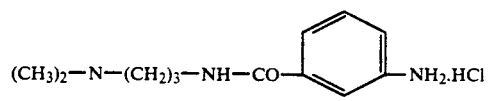

The procedure described in Example 1 B) is repeated, using 5.7 parts of this compound, to give the dye of formula

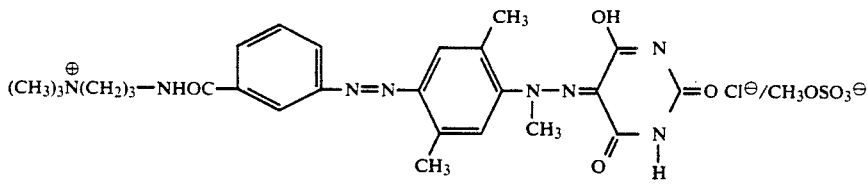

in the form of a powder which is soluble in dilute formic acid and dyes paper in a yellowish orange shade. The dyeings obtained on paper have good light- and wetfastness properties.

EXAMPLE 3

A) 65.7 parts of diethylaminopropylamine are added dropwise over 15 minutes to a solution of 47 parts of p-nitrobenzoyl chloride in 174 parts of toluene. The ensuing reaction is exothermic, the temperature rising to 90° C. After the temperature has fallen to 35° C., 100 parts of water are added and the mixture is stirred. After waiting for phase separation, the organic phase is washed with water, dried, and concentrated by evaporation. The residue is dissolved in 45 parts of methanol and 28.5 parts of 32% hydrochloric acid, and hydrogenation is carried out as described in Example 1 A) to give the compound of formula

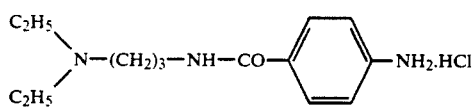

The procedure described in Example 1 B) is repeated, using 5.5 parts of this compound, to give the dye of formula

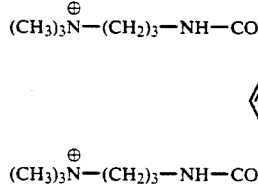

in the form of a powder which is soluble in dilute formic acid and dyes paper in a yellowish orange shade. The dyeings obtained on paper have good light- and wetfastness properties.

EXAMPLE 4

63.9 parts of dimethyl 5-nitroisophthalate and 87.1 parts of dimethylaminopropylamine are stirred together for 12 hours at 45°–50° C. Methanol and excess amine are then removed by vacuum distillation. The residue is dissolved in 180 parts of water and the solution is hydrogenated over palladium on carbon. The aqueous solution contains the compound of formula

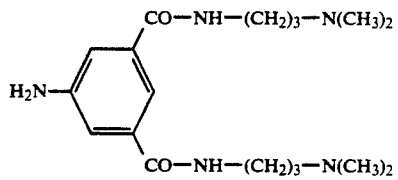

The procedure described in Example 1 B) is repeated, using 18.3 parts of the aqueous solution containing 6.2 parts of this compound, to give the compound of formula

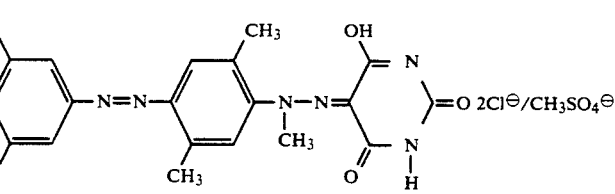

in the form of a powder which is soluble in water or dilute acids and dyes paper in a yellowish orange shade. The dyeings obtained on paper have good light- and wetfastness properties.

EXAMPLES 5–12

The procedure described in Example 1 is repeated, using equivalent amounts of the aniline derivatives listed in column 2 and of the coupling components listed in column 3 of the following Table, to give dyes of formula

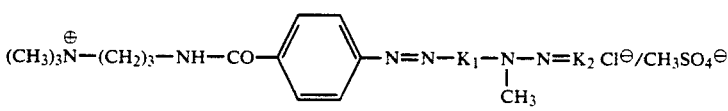

which dye paper in the shades of good fastness properties indicated in column 4.

| No. | K₁ | K₂ | Shade on paper |
|---|---|---|---|
| 5 | (2,5-dimethylphenyl) | barbituric acid N,N'-dimethyl derivative | golden yellow |
| 6 | (2-methoxy-5-methylphenyl) | barbituric acid derivative | orange |
| 7 | (2-methoxy-5-methylphenyl) | barbituric acid N,N'-dimethyl derivative | orange |
| 8 | (2,4-dimethoxyphenyl) | barbituric acid derivative | red |
| 9 | (2,5-dimethylphenyl) | N-cyano barbituric acid derivative | golden yellow |
| 10 | (2,5-dimethylphenyl) | thiobarbituric acid derivative | orange |
| 11 | (3-methylphenyl) | barbituric acid derivative | yellow |
| 12 | (2,5-dimethyl-4-NHCOOC₂H₅-phenyl) | barbituric acid derivative | golden yellow |

EXAMPLES 13-19

The procedure described in Example 4 is repeated, using equivalent amounts of the aniline derivatives listed in column 2 and of the coupling components listed in column 3 of the following Table, to give dyes of formula

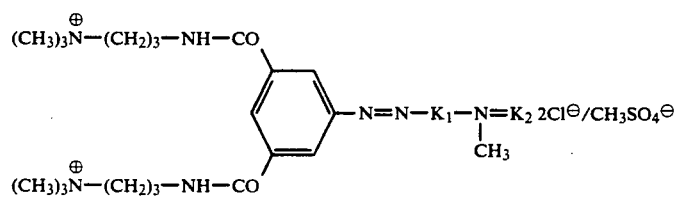

which dye paper in the shades of good fastness properties indicated in column 4.

| No. | K₁ | K₂ | Shade on paper |
|---|---|---|---|
| 13 | (2,5-dimethylphenyl) | barbituric acid N,N'-dimethyl derivative | yellow |
| 14 | (2,5-dimethylphenyl) | N-cyano barbituric acid derivative | orange |
| 15 | (2-methoxy-5-methylphenyl) | barbituric acid derivative | orange |
| 16 | (2-methoxy-5-methylphenyl) | barbituric acid N,N'-dimethyl derivative | orange |

| No. | $K_1$ | $K_2$ | Shade on paper |
|---|---|---|---|
| 17 | 2,4-dimethylphenyl | H₂N-C(=N)-NH-C(=NH)-NH₂ (guanidine-type) | orange |
| 18 | 3-methylphenyl | HO-pyrazolone (N-H) | yellow |
| 19 | 4-(NHCOOC₂H₅)phenyl | HO-pyrazolone (N-H) | yellow |

EXAMPLES 20-23

The procedure described in Example 3 is repeated, using equivalent amounts of the aniline derivatives listed in column 2 and of the coupling components listed in column 3 of the following Table, to give dyes of formula

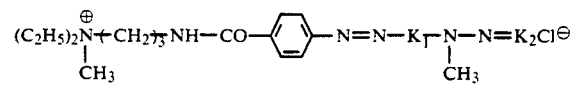

which dye paper in the shades of good fastness properties indicated in column 4.

| No. | $K_1$ | $K_2$ | Shade on paper |
|---|---|---|---|
| 20 | 2-OCH₃, 5-CH₃ phenyl | HO-pyrazolone (N-H) | orange |
| 21 | 2-OCH₃, 5-OCH₃ phenyl | HO-pyrazolone (N-H) | red |
| 22 | 4-NHCOOC₂H₅ phenyl | HO-pyrazolone (N-H) | yellow |
| 23 | 4-NHCOOC₂H₅ phenyl | N,N-dimethyl barbituric acid type | yellow |

EXAMPLE 24

50 parts of chemically bleached beech sulfite are mixed with 50 parts of bleached spruce pulp RKN 15 (SR freeness 22°) and 2 parts of the dye of Example 1 in water (pH 6, waterhardness 10° dH, temperature 20° C., goods to liquor ratio 1:40). After stirring for 15 minutes, paper sheets are produced on a Frank sheet former.

The paper is dyed in a very deep golden yellow shade. The wastewater is virtually colourless. The degree of exhaustion is almost 100%. The light- and wetfastness properties are excellent.

EXAMPLE 25

A paper web of bleached beech sulfite (22° SR) is prepared on a continuously operating laboratory paper machine. Ten seconds before the stock preparation, an aqueous solution of the dye of Example 1 is added continuously to the dilute pulp with vigorous turbulence (0.5% colouration, goods to liquor ratio 1:400, water hardness 10° dH, pH 6, temperature 20° C.).

The paper web is coloured in a strong orange shade of average intensity. The wastewater is completely colourless.

EXAMPLE 26

10 parts of cotton fabric (bleached mercerised cotton) are dyed in a laboratory beam dyeing machine in 200 parts of a liquor (water hardness 10° dH, pH 4; 3 circulations of the liquor per minute) which contains 0.05 part of the dye of Example 1. The temperature is raised in the course of 60 minutes from 20° to 100° C., then kept constant for 15 minutes.

The dyebath is completely exhausted and the cotton fabric is dyed in a strong orange shade of good lightfastness and very good wetfastness.

If textile fabric of regenerated cellulose (viscose) is dyed by the same procedure, the dye of Example 1 gives on this material a strong orange dyeing of good lightfastness and very good wetfastness properties.

What is claimed is:

1. An unsulfonated cationic azo dye of formula

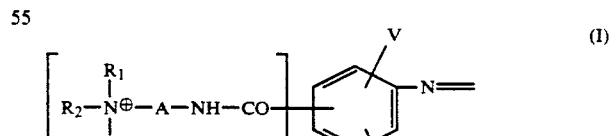

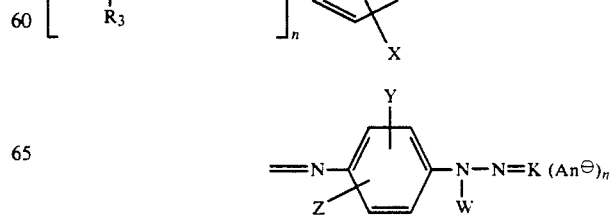

wherein

R$_1$, R$_2$ and R$_3$ are each independently of one another an unsubstituted or substituted alkyl radical or R$_1$ and R$_2$, together with the linking nitrogen atom, or R$_1$, R$_2$ and R$_3$, together with the linking nitrogen atom, are a heterocyclic radical, A is an alkylene radical of 2 to 6 carbon atoms, V and X are each independently of the other hydrogen, C$_1$-C$_4$alkyl or C$_1$-C$_4$alkoxy, each unsubstituted or substituted by hydroxy, halogen, cyano or C$_1$-C$_4$alkoxy, Y is hydrogen, C$_1$-C$_4$alkyl or C$_1$-C$_4$alkoxy, halogen or cyano, Z is hydrogen, C$_1$-C$_4$alkyl or C$_1$-C$_4$alkoxy, halogen, cyano, a group of formula

—NH—CHO,

—NH—CO—NH$_2$,

—NH—CO—NH—Q or

—NH—CO—(O)$_m$—Q, wherein m is 0 or 1 and Q is unsubstituted or substituted C$_1$-C$_4$alkyl or phenyl, W is an unsubstituted or substituted alkyl radical, K is a coupling component of formula

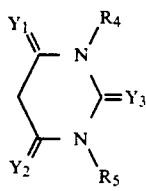

(II)

wherein

Y$_1$ and Y$_2$ are each independently of the other =O, =NH or =N-C$_1$-C$_4$alkyl, Y$_3$ is =O, =S, =NR or =N—CN, wherein R is hydrogen or C$_1$-C$_4$alkyl, R$_4$ and R$_5$ are each independently of the other hydrogen, unsubstituted or substituted alkyl or unsubstituted or substituted phenyl, n is 1 or 2, and An$^\ominus$ is an anion.

2. A disazo dye according to claim 1, wherein R$_1$, R$_2$, R$_3$ und W are each independently of one another methyl, ethyl, n- or isopropyl, n-, sec- or tert-butyl, straight-chain or branched pentyl or hexyl, cyclopentyl or cyclohexyl, which radicals may be substituted by hydroxy, alkoxy, cyano, carbamoyl or carbamoyl which is mono- or dialkylated at the N-atom, or phenyl which may be further substituted by alkyl or alkoxy.

3. An azo dye according to claim 2, wherein R$_1$ is methyl or hydroxyethyl and R$_2$ and R$_3$ are each independently of the other C$_1$-C$_3$alkyl and are preferably each methyl.

4. An azo dye according to claim 1, wherein V is hydrogen.

5. An azo dye according to claim 1, wherein X is hydrogen, methyl or methoxy.

6. An azo dye according to claim 1, wherein Y is hydrogen, methyl, methoxy or chloro.

7. An azo dye according to claim 1, wherein Z is methyl, ethyl, methoxy, ethoxy, acetylamino, propionylamino, methoxycarbonylamino, ethoxycarbonylamino or a group of formula

—NH—CHO, —NH—CO—NH$_2$,

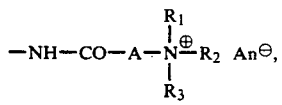

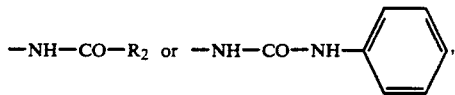

wherein A is methylene, ethylene, propylene or butylene, R$_1$ is methyl or hydroxyethyl, and R$_2$ and R$_3$ are each independently of the other C$_1$-C$_3$alkyl.

8. An azo dye according to claim 1, wherein W is C$_1$-C$_4$alkyl which may be substituted by hydroxy, cyano, alkoxy, phenyl or carbamoyl.

9. An azo dye according to claim 1, wherein R$_4$ and R$_5$ are each independently of the other methyl, ethyl, n- or isopropyl, n-, sec- or tert-butyl, straight-chain or branched pentyl or hexyl or cyclohexyl, which may each be substituted by —OH, C$_1$-C$_4$alkoxy or C$_1$-C$_4$hydroxyalkoxy, or are phenyl which may be substituted by C$_1$-C$_4$alkyl or C$_1$-C$_4$alkoxy, chloro, bromo or nitro.

10. An azo dye according to claim 9, wherein R$_4$ and R$_5$ are each independently of the other hydrogen or C$_1$-C$_4$alkyl.

11. An azo dye according to claim 1, wherein Y$_1$ and Y$_2$ are each independently of the other =O or =NH.

12. An azo dye according to claim 11, wherein Y$_1$ and Y$_2$ are identical.

13. An azo dye according to claim 12, wherein Y$_1$ and Y$_2$ are each =O.

14. An azo dye according to claim 1, wherein Y$_3$ is =O, =S, =NH or =N-CN, preferably =O.

15. An azo dye according to claim 1, wherein

R$_1$ is methyl or hydroxyethyl,

R$_2$ and R$_3$ are each independently of the other C$_1$-C$_3$alkyl,

A is ethylene, propylene or butylene,

V is hydrogen,

X is hydrogen, methyl or methoxy,

Y is hydrogen, methyl, methoxy or chloro,

Z is methyl, methoxy, ethyl, ethoxy, acetylamino, propionylamino, methoxycarbonylamino, ethoxycarbonylamino or a group of formula

—NH—CHO, —NH—CO—NH$_2$,

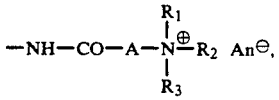

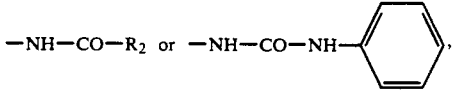

W is C$_1$-C$_4$alkyl or C$_1$-C$_4$alkyl which is substituted by hydroxy, cyano, C$_1$-C$_4$alkoxy, phenyl or carbamoyl, K is a coupling component of formula

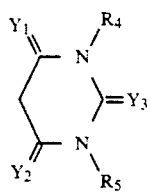

wherein $Y_1$ and $Y_2$ are each independently of the other =O or =NH, $Y_3$ is =O, =S, =NH or =N-CN, $R_4$ and $R_5$ are each independently of the other hydrogen or $C_1$-$C_4$alkyl, n is 1 or 2, and $An^\ominus$ is an anion.

16. An azo dye according to claim 15, wherein $R_1$, $R_2$ and $R_3$ are each methyl, A is propylene, V and X are each hydrogen, $Y_3$ is =O, $R_4$ and $R_5$ are each hydrogen or methyl, and the other symbols are as defined in claim 14.

17. A process for the preparation of an azo dye of formula I according to claim 1, which comprises diazotising an amine of formula

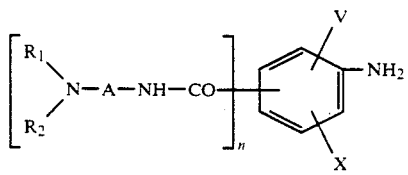

reacting the diazotised amine with a coupling component of formula

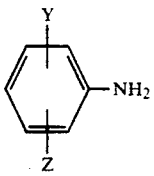

diazotising the aminoazo compound so obtained and coupling the diazotised aminoazo compound with a coupling component of formula

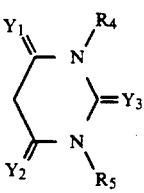

and subsequently reacting the coupling product with an alkylating agent which introduces the radicals $R_3$ and W, which radicals $R_3$ and W have the identical meaning and $R_1$, $R_2$, $R_3$, A, V, X, Y, Z, $Y_1$, $Y_2$, $Y_3$, $R_4$, $R_5$, n, W and $An^\ominus$ are as defined in claim 1.

18. A process for the preparation of an azo dye of formula I according to claim 1, which comprises reacting a dye of formula

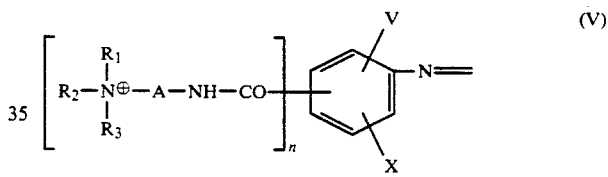

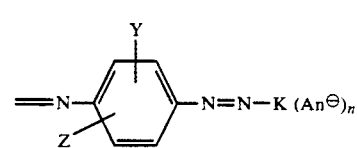

with an alkylating agent which introduces the group W, in which formula V $R_1$, $R_2$, $R_3$, A, n, V, X, Z, Y, K, $An^\ominus$ and W are as defined for formula I.

* * * * *